(12) United States Patent
Metcalfe

(10) Patent No.: US 7,506,908 B2
(45) Date of Patent: Mar. 24, 2009

(54) GRIPPING TOOL

(75) Inventor: Nick J Metcalfe, Bridgend (GB)

(73) Assignee: Biomet Manufacturing Corp., Warsaw, IN (US)

( * ) Notice: Subject to any disclaimer, the term of this patent is extended or adjusted under 35 U.S.C. 154(b) by 647 days.

(21) Appl. No.: 11/063,393

(22) Filed: Feb. 23, 2005

(65) Prior Publication Data

US 2005/0183551 A1     Aug. 25, 2005

(30) Foreign Application Priority Data

Feb. 24, 2004    (GB) ................................ 0404116.6

(51) Int. Cl.
    *B25B 9/02*       (2006.01)
(52) U.S. Cl. ..................... 294/99.2; 606/104
(58) Field of Classification Search ................ 294/99.2, 294/15; 81/3.43, 3.44, 64, 90.3; 254/18; 606/104; 16/422; 30/120.1–120.3
See application file for complete search history.

(56) References Cited

U.S. PATENT DOCUMENTS

| 3,215,006 | A | * | 11/1965 | Urani | 81/3.8 |
|---|---|---|---|---|---|
| 4,226,459 | A | * | 10/1980 | Natalicio | 294/99.2 |
| 4,227,730 | A | * | 10/1980 | Alexander et al. | 294/99.2 |
| 4,244,094 | A | * | 1/1981 | Rucinski | 29/270 |
| 4,509,784 | A | | 4/1985 | Vollers | |
| 5,044,058 | A | * | 9/1991 | Voss | 29/278 |
| 5,375,488 | A | * | 12/1994 | Baitner | 81/44 |
| 6,066,143 | A | * | 5/2000 | Lane | 606/104 |
| 6,189,421 | B1 | * | 2/2001 | Futo et al. | 81/64 |
| 6,673,078 | B1 | * | 1/2004 | Muncie | 606/104 |

FOREIGN PATENT DOCUMENTS

DE             29506764        8/1995

* cited by examiner

*Primary Examiner*—Dean J Kramer
(74) *Attorney, Agent, or Firm*—Harness Dickey

(57) ABSTRACT

A gripping tool includes a pair of handles and a resilient element integrally formed with and connecting the pair of handles. An opening is defined on at least one of the pair of handles or the resilient element. The opening is adapted to receive an article to be gripped. One of the handles of the pair of handles comprises a jaw adapted to grip the article against at least one of the other handle of the pair of handles or the resilient member.

12 Claims, 4 Drawing Sheets

GRIPPING TOOL

FIELD

This invention relates to a gripping tool and particularly, although not exclusively, relates to a one piece gripping tool for gripping and removing drill pins and nails.

INTRODUCTION

During orthopaedic surgery, it is often necessary to attach a guide jig or other instrumentation to a bone. Typically, drill pins or nails may be used to hold or guide the jig or other instrumentation in position on the bone. These can be drilled or nailed in to either cancelous or cortical bone. Drills may be used in most instances as they may be quicker and less invasive than nails. They may also enable jigs to be removed (leaving the drill pins in place) and relocated in a slightly different position, either to advance or rotate a resection block by a given distance or angle. However, a potential drawback with drill pins is that sometimes the resection blocks may migrate up due to the vibration when using an oscillating saw. Also, they sometimes may protrude further out than nails. Consequently, nails not only hold jigs or other instrumentation tighter on to the bone, but also have a lower profile and therefore enable saws to pass over them. When the resecting of the bone is complete, the drills or pins need to be removed. In one example, this may have been done using a conventional hand tool such as pliers. However, in some instances the drills or pins may be very firmly located in the bone and therefore difficult to remove with such tools. Furthermore, if the drill or pin is not held properly, it may be damaged as it is removed.

SUMMARY OF THE INVENTION

A gripping tool includes a pair of handles and a resilient element formed with and connecting the pair of handles. An opening is defined on at least one of the pair of handles or the resilient element. The opening is adapted to receive an article to be gripped. One of the handles includes a jaw adapted to grip the article against at least one of the other handles or the resilient member.

In various embodiments the jaw is formed in an end of one of the handles adjacent the resilient element. The jaw comprises a recess shaped to receive the article closely. The article includes a pin. The jaw is adapted to engage a head of the pin and apply a gripping force between the jaw and the resilient element in a direction substantially parallel to a longitudinal axis of the pin.

According to other various embodiments the article includes a drill. The jaw and a portion of the other handle are adapted to grip a shaft of the drill therebetween creating a gripping force in a direction substantially perpendicular to a longitudinal axis of the drill.

A method of gripping an article includes providing a tool having a pair of handles integrally formed with and connected by a resilient element. The pair of handles each define respective jaws. A portion of the article is located through a recess defining a mouth on at least one of the handles or the resilient element. At least one of the handles is actuated whereby the portion of the article is forced by one of the jaws into one of the mouth or the other handle in a secure position.

Further areas of applicability of the present invention will become apparent from the detailed description provided hereinafter. It should be understood that the detailed description and specific examples, while indicating the embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
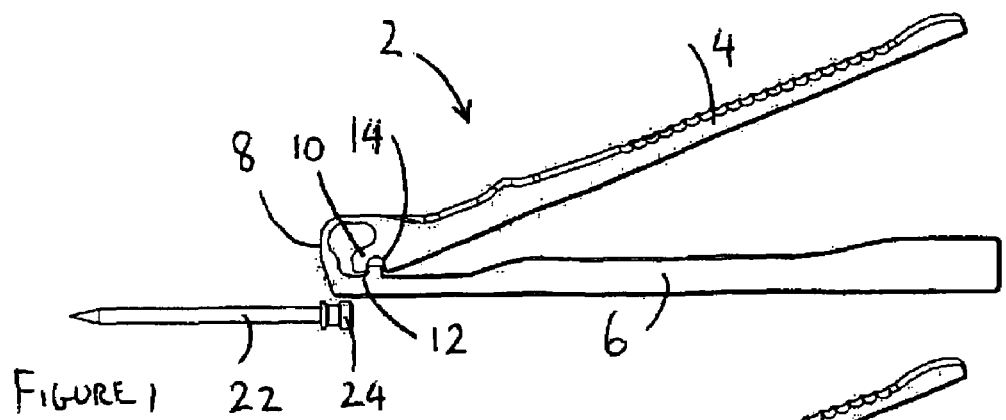
FIG. 1 in a side view of a gripping tool adjacent a pin which is to be gripped.
Figure 2:
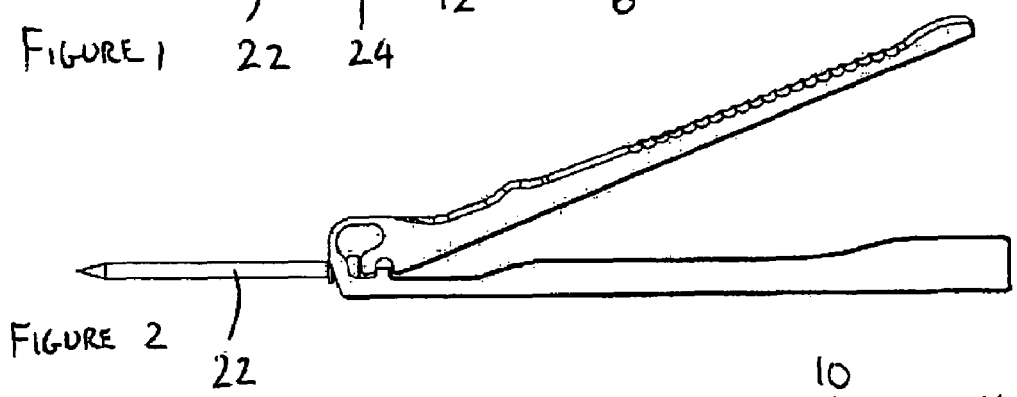
FIG. 2 in a side view of the gripping tool gripping the pin.

The following description of the embodiment(s) is merely exemplary in nature and is in no way intended to limit the invention, its application, or uses.

FIGS. 1 to 4 show a gripping tool 2 formed in one piece from, for example, stainless steel. The gripping tool 2 may be formed from a pair of handles 4, 6 integrally formed with, and interconnected by, a resilient element 8. The resilient element 8 may be formed by thinning the material of the gripping tool in the region adjoining the handles 4, 6. The ends of the handles 4, 6 adjacent the resilient element 8 comprise jaws 10, 12. The jaw 10 may be bifurcated and defines a groove 14. The jaw 12 comprises a transverse rib 15 which may be aligned with the groove 14.

Figure 3:
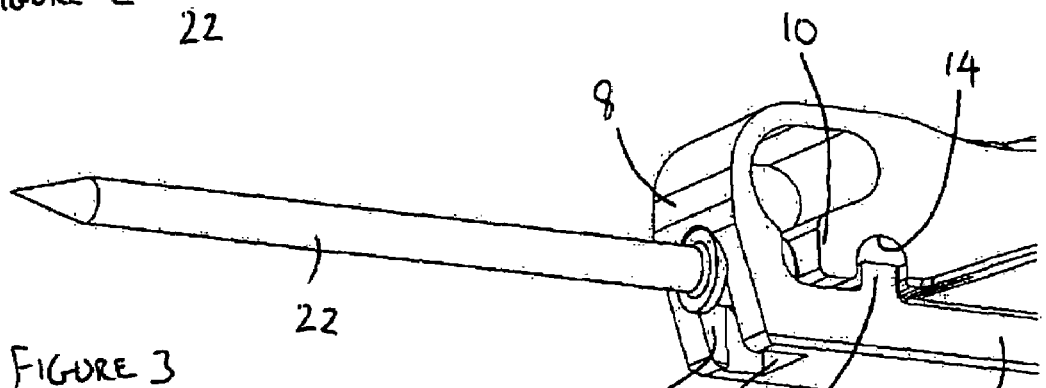
FIG. 3 is an enlarged perspective view from below showing the pin gripped by the gripping tool.
Figure 4:
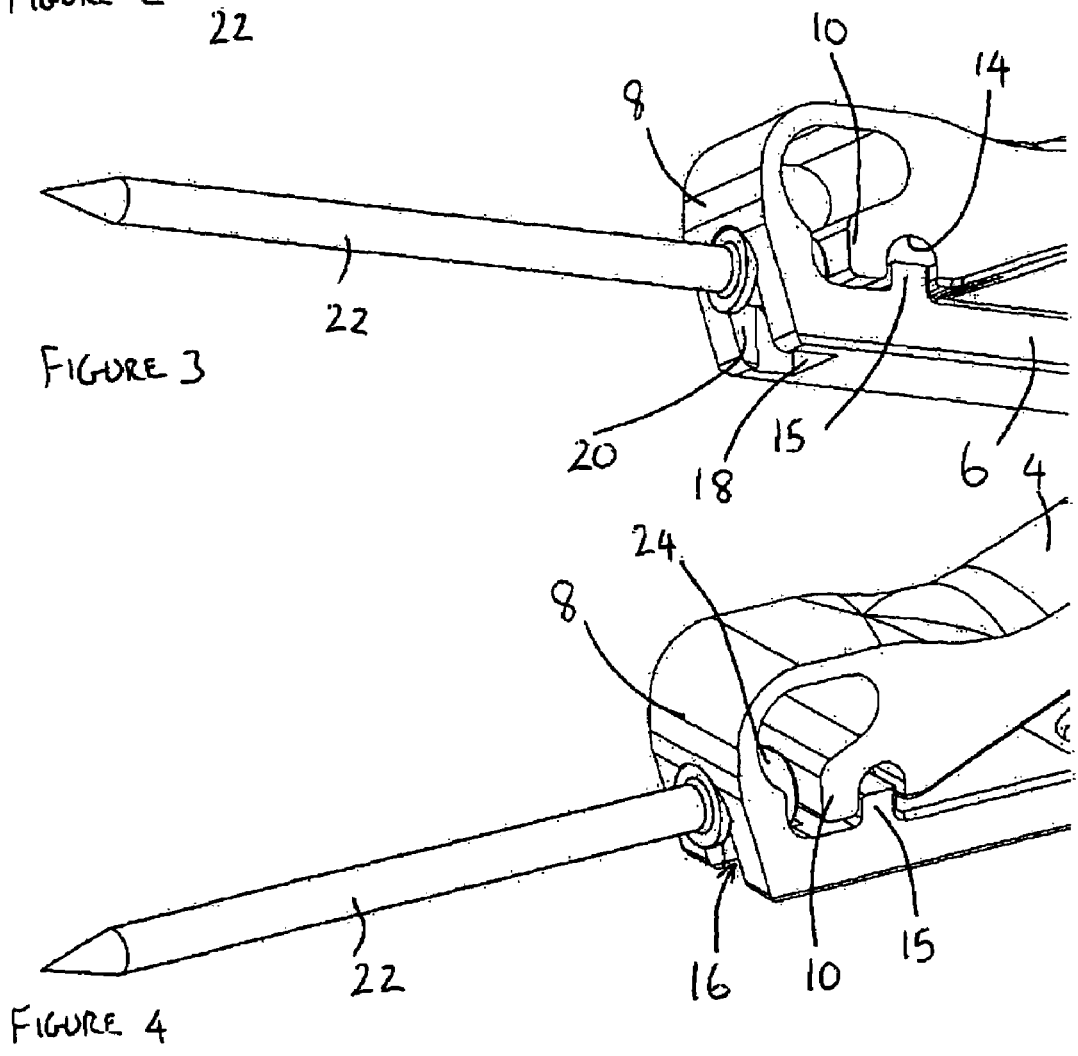
FIG. 4 is an enlarged perspective view from above showing the pin gripped by the gripping tool.

As best shown in FIGS. 3 and 4, a recess 16 may be formed in the resilient element 8 and in the end of the handle 6 adjacent the resilient element 8. A bottom 18 of the recess 16 is wider than a mouth 20 of the recess 16.

In use, the gripping tool may be offered up to a nail 22, such that a head 24 of the nail 22 is aligned with the recess 16. The head 24 of the nail 22 is then slid into the recess 16 and the handles 4, 6 are squeezed together, such that the jaw 10 forces the head 24 of the nail 22 against the mouth 20 of the recess 16. The nail is thereby gripped far more firmly than is possible with a conventional tool such as pliers.

Figure 5:
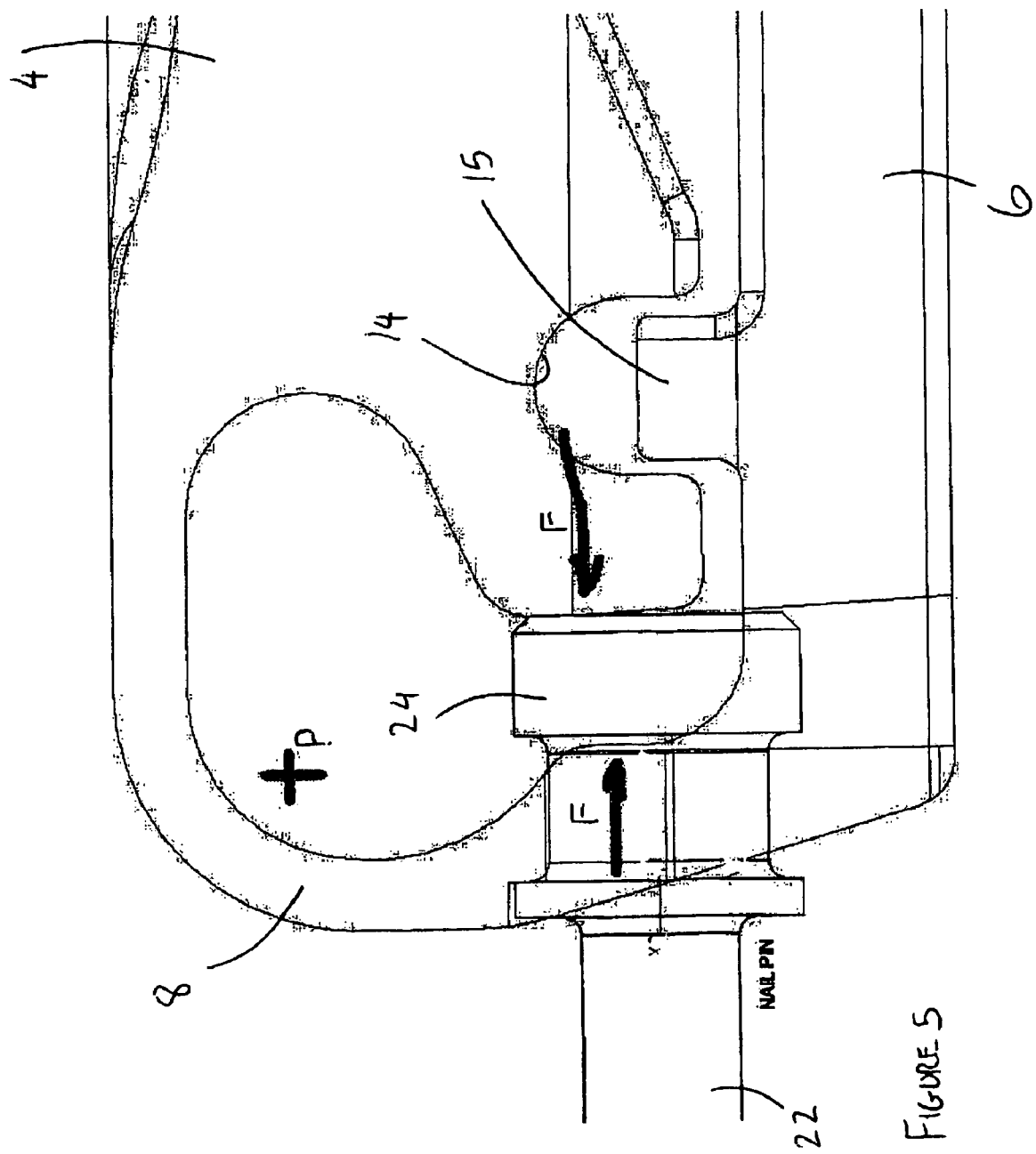
FIG. 5 is an enlarged cut away view showing the head of the pin gripped by the gripping tool.
Figure 6:
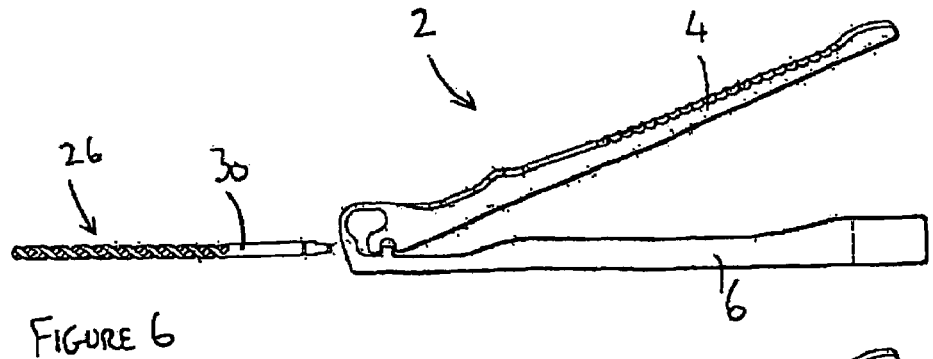
FIG. 6 is a side view of the gripping tool adjacent a drill which is to be gripped.
Figure 7:
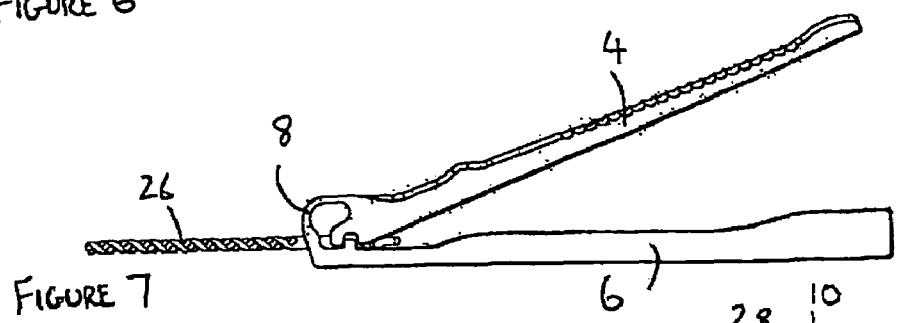
FIG. 7 in a side view of the gripping tool gripping the drill.
Figure 8:
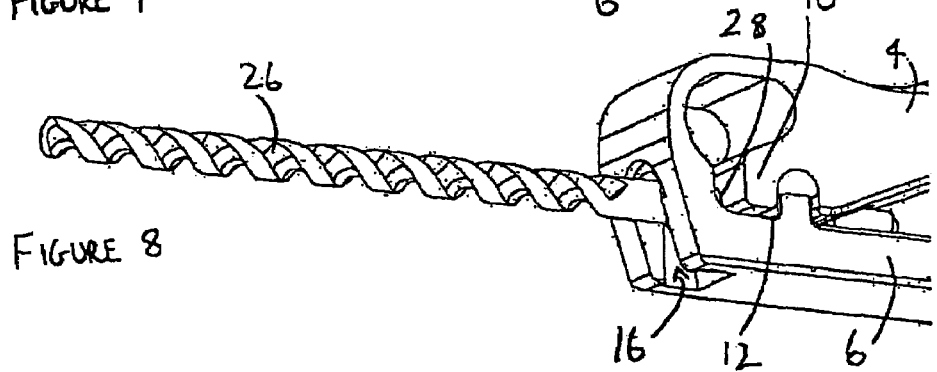
FIG. 8 is an enlarged perspective view from below showing the drill gripped by the gripping tool.
Figure 9:
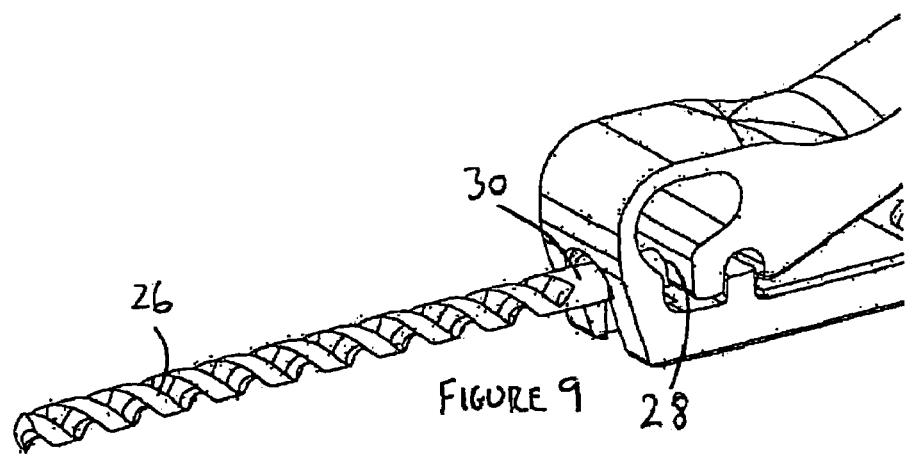
FIG. 9 is an enlarged perspective view from above showing the drill gripped by the gripping tool.

Referring to FIG. 5, it will be appreciated that a clamping force F is applied to the head 24 of the nail 22 in a direction substantially parallel to a longitudinal axis of the nail 22. The harder the handles 4, 6 are squeezed together, the more the resilient element 8 flexes, so that the handles effectively pivot about a point P illustrated in FIG. 5. The appropriate resilience of the resilient element 8 may be achieved by reducing the thickness of the material of the resilient element 8 such that the handles 4, 6 may be moved together relatively easily to grip the head 24 of the nail 22, while still ensuring sufficient strength and fatigue life in the resilient element 8.

FIGS. 6 to 10 show an exemplary method of utilizing the gripping tool 2 to grip an exemplary drill 26. In use, the drill 26 may be pushed through the recess 16 in the resilient element 8 and into a longitudinal groove 28 which may be formed in the surface of the jaws 10 and 12. The handles 4, 6 are then squeezed together, causing the jaws 10, 12 to grip a shank 30 of the drill.

Figure 10:
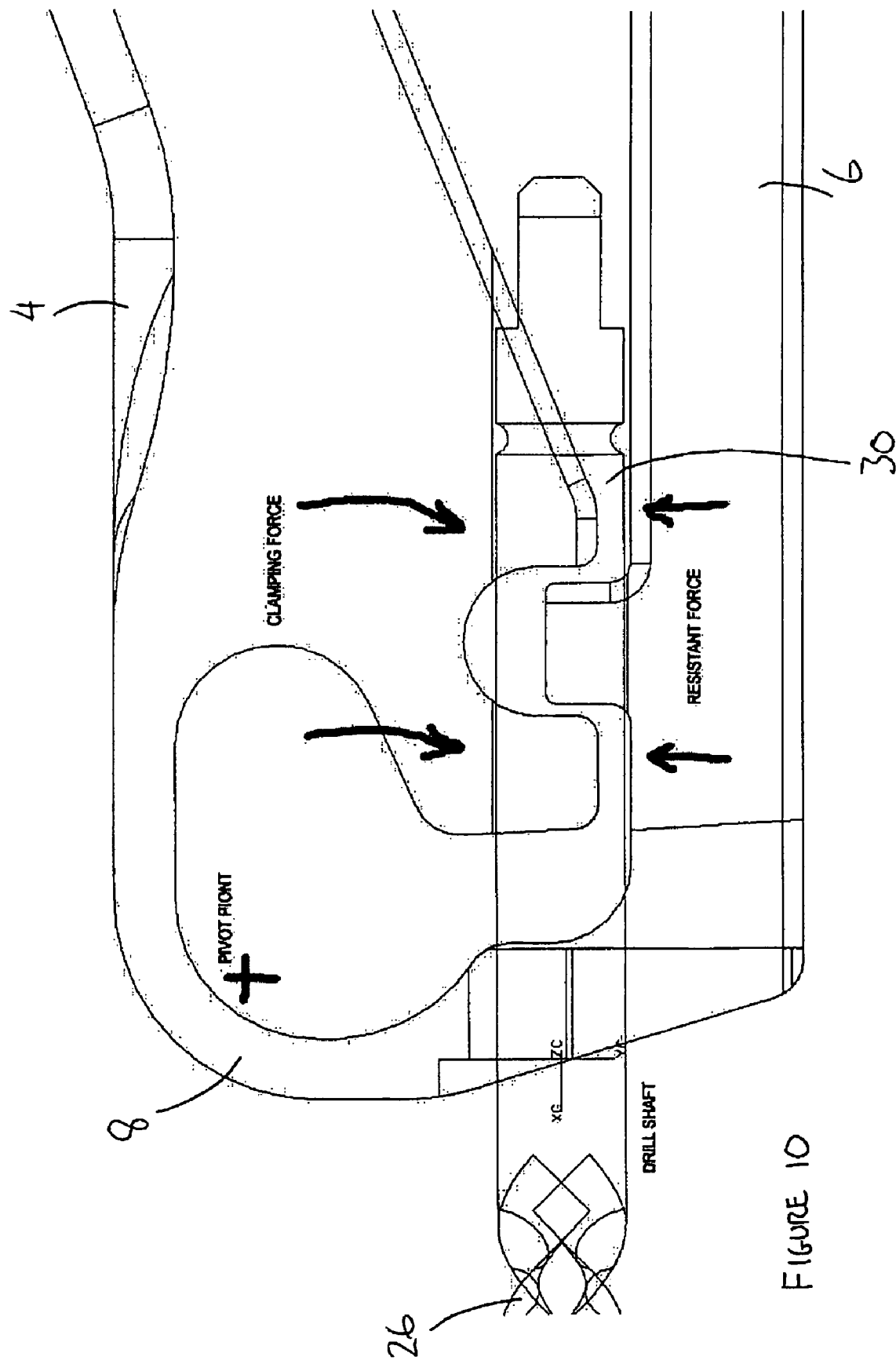
FIG. 10 is an enlarged cut away view showing the drill being gripped by the gripping tool.

Referring to FIG. 10, it will be appreciated that a clamping force F is applied to the shaft 30 of the drill 26 in a direction substantially perpendicular to a longitudinal axis of the drill 26. The longitudinal groove 28 may be shaped to receive the drill closely, so that the surface area contact between the drill 26 and longitudinal groove 28 is maximized. The clamping action applied to the drill is sufficient to enable the drill to be turned clockwise and counter-clockwise by hand, in order to work it loose from the bone.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A gripping tool comprising:
    a pair of handles;
    a resilient element integrally formed with and connecting the pair of handles; and
    an opening defined on at least one of the pair of handles or the resilient element, the opening adapted to receive a pin to be gripped, the pin defining a longitudinal axis;
    wherein one of the handles of the pair of handles comprises a jaw formed in an end of one of the handles of the pair of handles adjacent the resilient element, the jaw comprising a recess shaped to receive the pin closely, the jaw being adapted to engage a head of the pin and grip the pin against at least one of the other handle of the pair of handles or the resilient member and provide a gripping force between the jaw and the resilient element in a direction substantially parallel to the longitudinal axis of the pin.

2. The gripping tool of claim 1 wherein at least one of the jaw or a portion of the other handle of the pair of handles are shaped to engage a particular formation on the pin.

3. A method of gripping an article having a longitudinal axis, the method comprising:
    providing a tool having a pair of handles integrally formed with and connected by a resilient element, the pair of handles each defining respective jaws;
    locating a portion of the article through a recess defining a mouth on at least one of the handles or the resilient element, wherein locating a portion of the article includes locating a head of a nail through the recess; and
    actuating at least one of the pair of handles whereby the portion of the article is forced by one of the jaws into one of the mouth or the other handle in a secure position and a gripping force is applied between one of the jaws and the mouth in a direction substantially parallel to the longitudinal axis.

4. A gripping tool comprising:
    a pair of handles defining a pair of gripping portions on respective first ends and a pair of jaws on respective second ends;
    a resilient element integrally formed with and connecting the pair of handles proximate the respective pair of jaws; and
    a recess defining a mouth on at least one of the pair of handles or the resilient element, the recess adapted to receive an article to be gripped;
    wherein the tool is adapted to selectively retain a first article in a first position and a second article in a second position, said tool applying a gripping force in a direction substantially parallel to a longitudinal axis of the first article between one of jaws of the pair of jaws and the mouth in the first position and a direction substantially perpendicular to a longitudinal axis of the second article between the pair of jaws in the second position.

5. The gripping tool of claim 4 wherein the recess is defined through the resilient element and one of the handles.

6. The gripping tool of claim 5 wherein one of the jaws defines a groove for accepting the other of the jaws in the first and second position.

7. The gripping tool of claim 6 wherein the recess defines a bottom portion wider than the mouth and wherein a head of the first article is adapted to pass through the bottom portion of the recess.

8. A method of gripping an article having a longitudinal axis, the method comprising:
    providing a tool having a pair of handles integrally formed with, and connected by a resilient element, the pair of handles each defining respective jaws;
    locating a shaft of a drill through a recess defining a mouth on at least one of the handles or the resilient element; and
    actuating at least one of the pair of handles whereby the shaft of the drill is forced by one of the jaws into one of the mouth or the other handle in a secure position and a gripping force is applied between one of the jaws and the mouth in a direction substantially perpendicular to the longitudinal axis.

9. A gripping tool comprising:
    a pair of handles;
    a resilient element integrally formed with and connecting the pair of handles; and
    an opening defined on at least one of the pair of handles or the resilient element, the opening adapted to receive a drill to be gripped, the drill defining a longitudinal axis;
    wherein one of the handles of the pair of handles comprises a jaw formed in an end of one of the handles of the pair of handles adjacent the resilient element, the jaw comprising a recess shaped to receive the drill closely, wherein the jaw and a portion of the other handle of the pair of handles are adapted to grip a shaft of the drill therebetween creating a gripping force in a direction substantially perpendicular to a longitudinal axis of the drill.

10. The gripping tool of claim 9 wherein at least one of the jaw or a portion of the other handle of the pair of handles are shaped to engage a particular formation on the drill.

11. A method of gripping an article having a longitudinal axis, the method comprising:

providing a tool having a pair of handles integrally formed with and connected by a resilient element, the pair of handles each defining respective jaws;

locating a portion of the article through a recess defining a mouth on at least one of the handles or the resilient element, wherein locating a portion of the article includes locating a shaft of a drill through the recess; and actuating at least one of the pair of handles whereby the portion of the article is forced by one of the jaws into one of the mouth or the other handle in a secure position and a gripping force is applied between one of the jaws and the mouth in a direction substantially parallel to the longitudinal axis.

12. The method of claim 11 wherein actuating at least one of the pair of handles includes applying a gripping force between the one of the jaws and the other handle, the gripping force being applied in a direction substantially perpendicular to a longitudinal axis of the drill.

* * * * *